United States Patent [19]

Inaba et al.

[11] Patent Number: 4,697,196

[45] Date of Patent: Sep. 29, 1987

[54] ELECTROSTATIC RECORDING METHOD AND APPARATUS

[75] Inventors: Yutaka Inaba, Kawaguchi; Hiroshi Satomura, Hatogaya; Yukio Nagase; Tatsuo Takeuchi, both of Tokyo; Hidemi Egami, Zama; Akihito Hosaka, Yokohama, all of Japan

[73] Assignee: Canon Kabushiki Kaisha, Tokyo, Japan

[21] Appl. No.: 827,431

[22] Filed: Feb. 10, 1986

[30] Foreign Application Priority Data

| | | | |
|---|---|---|---|
| Feb. 13, 1985 | [JP] | Japan | 60-25852 |
| Feb. 13, 1985 | [JP] | Japan | 60-25853 |
| Jun. 7, 1985 | [JP] | Japan | 60-122542 |

[51] Int. Cl.[4] .......... G01D 15/00

[52] U.S. Cl. .......... 346/159; 346/155

[58] Field of Search .......... 346/159, 155, 139 C; 250/426; 101/DIG. 13; 358/300; 400/119

[56] References Cited

U.S. PATENT DOCUMENTS

| | | | |
|---|---|---|---|
| 4,160,257 | 7/1979 | Carish | 346/159 |
| 4,365,549 | 12/1982 | Fotland et al. | 346/159 |
| 4,408,214 | 10/1983 | Fotland et al. | 346/159 |
| 4,409,604 | 10/1983 | Fotland et al. | 346/159 |
| 4,415,403 | 11/1983 | Bakewell | 346/159 |
| 4,558,334 | 12/1985 | Fotland | 346/159 |

*Primary Examiner*—Arthur G. Evans

*Attorney, Agent, or Firm*—Fitzpatrick, Cella, Harper & Scinto

[57] ABSTRACT

An electrostatic recording apparatus includes a recording member having a surface on which an electrostatic latent image is formed; a recording head, to effect discharging to produce the ions; first bias voltage source for applying a bias voltage to the second electrode; second bias voltage source for applying to the third electrode a bias voltage having the same polarity as that of the bias voltage applied to the second electrodes and having an absolute voltage which is smaller than that of the bias voltage applied to the second electrode. The parameters of the means for so determined that the ions produced by the recording head and moved to the recording surface are controlled so as to provide a high resolution image. For example, the number of occurrences of effective dischargeable voltages per one charge dot is not less than 10; a distance 1 (mm) between the recording surface and the third electrode, the bias voltage Vs (V) to the third electrode, a maximum surface potential Vd (V) of the recording surface in the area opposed to the recording head satisfy the relationships, $2.5\times 10^3 \leqq |Vs-Vd|/1$, and $1 \leqq 0.25$.

When the recording member has a curved surface, the number n of time sharing for operating the first electrodes, a picture element density of recording p (dots/mm), a radius of curvature of the recording surface R (mm) and a distance m (mm) between adjacent first electrodes, satisfy a relationship, $p\times R^{\frac{1}{2}}[/m(n-1)] \geqq 1.6$.

48 Claims, 15 Drawing Figures

ELECTROSTATIC RECORDING METHOD AND APPARATUS

FIELD OF THE INVENTION AND RELATED ART

The present invention relates to electrostatic recording method and apparatus wherein ions are produced in a recording head and deposited on a recording member in the shape of an image thereby forming an electrostatic image thereon.

It is known in the field of electrostatic printing or the like, as disclosed in U.S. Pat. Nos. 4,155,093, 4,160,257, 4,267,556, for example, that ions of high current density are produced, are extracted and are selectively applied to a chargeable member so that the chargeable member is charged in the shape of an image. This type of electrostatic recording is considered to be usable and effective because of its high speed printing and of its small size.

It has been found, however, that the size of a charge dot formed on the recording surface as a picture element varies even when the ions are discharged through the same aperture, with the result that the charge pattern formed by the charge dots is not uniform. After such charge pattern is developed, the density of the developed image is not uniform where it should be uniform, or there appears a void at a part where the developer should be deposited. Also, it has been found that the ions diverge when moving to the recording surface, and therefore, it is very difficult to increase the resolution of the image. Further, there is a problem that when a recording surface having a curvature, for example, a recording surface in the form of a cylindrical recording member is used, the size of the charge dot on the recording surface is not uniform, resulting in non-uniform density image. These problems have not been solved in the prior art.

SUMMARY OF THE INVENTION

Accordingly, it is a principal object of the present invention to provide electrostatic recording method and apparatus by which a high quality image is formed with a high resolution.

It is another object of the present invention to provide electrostatic recording method and apparatus wherein the charge dot formed through one and the same aperture is stabilized.

It is a further object of the present invention to provide electrostatic recording method and apparatus wherein the divergence of the ion flow from the recording head to the recording surface is prevented to a satisfactory extent.

It is a further object of the present invention to provide electrostatic recording method and apparatus used with a recording surface having a curvature, wherein the image is not disturbed.

According to the embodiments of the present invention, respective parameters are limited so as to increase the image quality and resolution.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
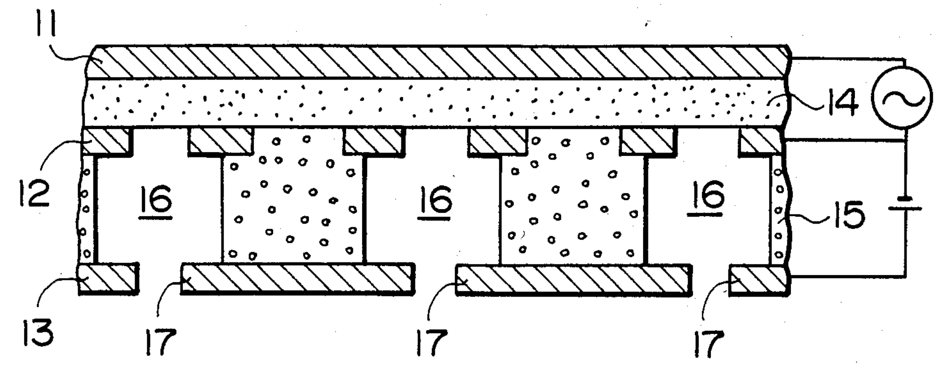
FIG. 1 is a sectional view of a recording head according to the present invention.
Figure 2:
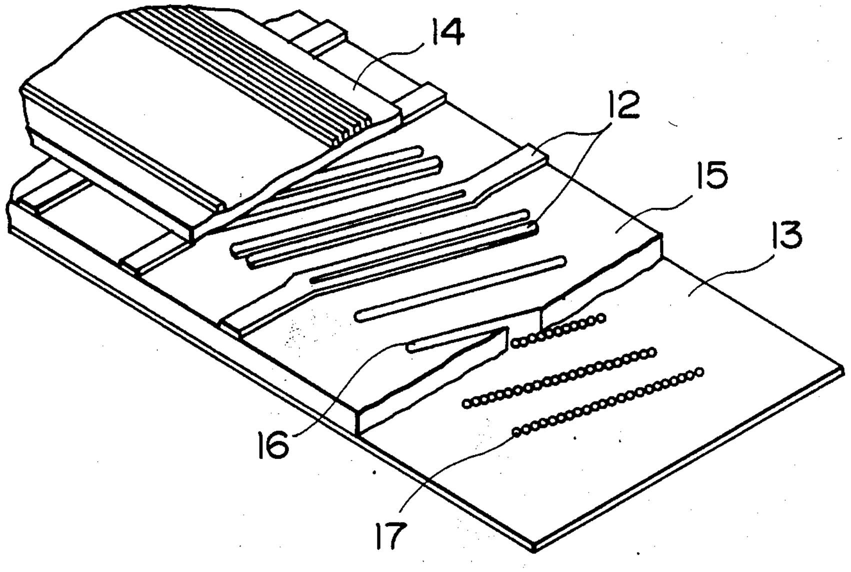
FIG. 2 is a partly broken away perspective view of the recording head shown in FIG. 1.

Referring to FIG. 1, there is shown a recording head usable with electrostatic recording method and apparatus according to an embodiment of the present invention. FIG. 2 is a perspective view of the recording head wherein it is partly broken away.

The electrostatic recording head 1 comprises a first electrode 11 which is an inducing electrode extending in a longitudinal direction (first direction), that is the lateral direction of the sheet of FIG. 1 and a second electrode 12 (finger electrode) 12 which is a discharging electrode extending in a second direction which is different from the first direction. Those electrodes constitute, when seen from the top, a matrix. There is a third electrode 13 across the second electrode 12 from the first electrode 11, the third electrode 13 having a plurality of apertures corresponding to the matrix. Between the first electrode 11 and the second electrode 12, there is a first dielectric member 14 sandwiched thereby. The first electrodes 11 and the second electrodes 12 are fixed on the respective sides of the first dielectric member 14. The second electrodes 12 and the third electrode 13 sandwich a second dielectric member 15. The second dielectric member 15 has apertures corresponding to the plural apertures of the third electrode 13.

In operation, an alternating voltage is applied between a selected one or ones of the first electrodes 11 and selected one or ones of the second electrodes 12, by which positive and negative ions are produced adjacent the second electrode 12 corresponding to a selected matrix determined by selection of the first and second electrodes. Between the second electrode 12 and the third electrode 13, a bias voltage is applied. Only the polarity of ions determined by the polarity of the bias voltage are extracted from the positive and negative ions produced. The extracted ions are passed through the apertures 16 and 17 so as to electrically charge an unshown chargeable member which is a recording member having a surface opposed to the apertures 17. Thus, dot electrostatic latent image is formed by selectively driving the plural first electrodes 11 and the second electrodes 12.

The inventors have found that in the recording head of this type as disclosed in U.S. Pat. Nos. 4,155,093, 4,160,257 and 4,267,556, the size of the charge dot formed on a recording surface varies even if the charge dot is formed through the same aperture 17, and conducted repeatedly various experiments and considerations. As a conclusion, it has been found that the time when the discharge occurs varies widely.

Figure 3:
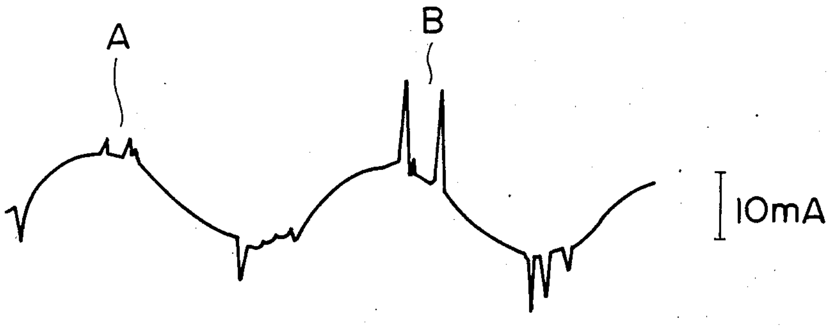
FIG. 3 illustrates non-uniform discharging.

FIG. 3 is a graph illustrating the results, wherein the electric current flowing through the first electrode 11 and the second electrode 12 is shown with time. In one period of the alternating current, there are plural (two typically) spike-like current peaks. This indicates the occurrence of a discharge which produces positive or negative ions. It is considered that the discharge is triggered at a place having a strong electric field, radiant rays or the like. The point of time when the discharge occurs is not constant but random. Also, the amount of discharge, that is, the amount of ion production also varies.

Figure 4:
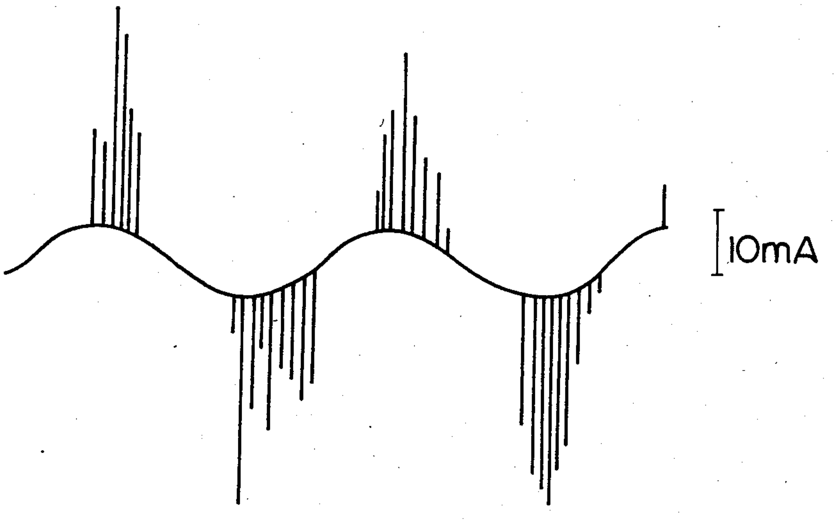
FIG. 4 also illustrates non-uniform discharging.

FIG. 4 is a graph wherein several of such graphs as shown in FIG. 3 are superimposed. It is clear that the moments of discharge occurrences vary randomly, and therefore, the amount of discharge varies.

The inventors have investigated the influence, to the size of the charge dot, of the variation of the discharge moments and amounts of the discharge, using small size toner particles and have found that the charge dot produced at a point of time A is relatively small and the charge dot produced at a point of time B is relatively large.

Further, the inventors have investigated the relation between the variation of the size (diameter) of the charge dot and the number of effective discharge occurrences (ion generations) per one charge dot (Here, "effective" is intended to mean the discharge having the desired polarity, which will become apparent in the description hereinafter).

Figure 8:
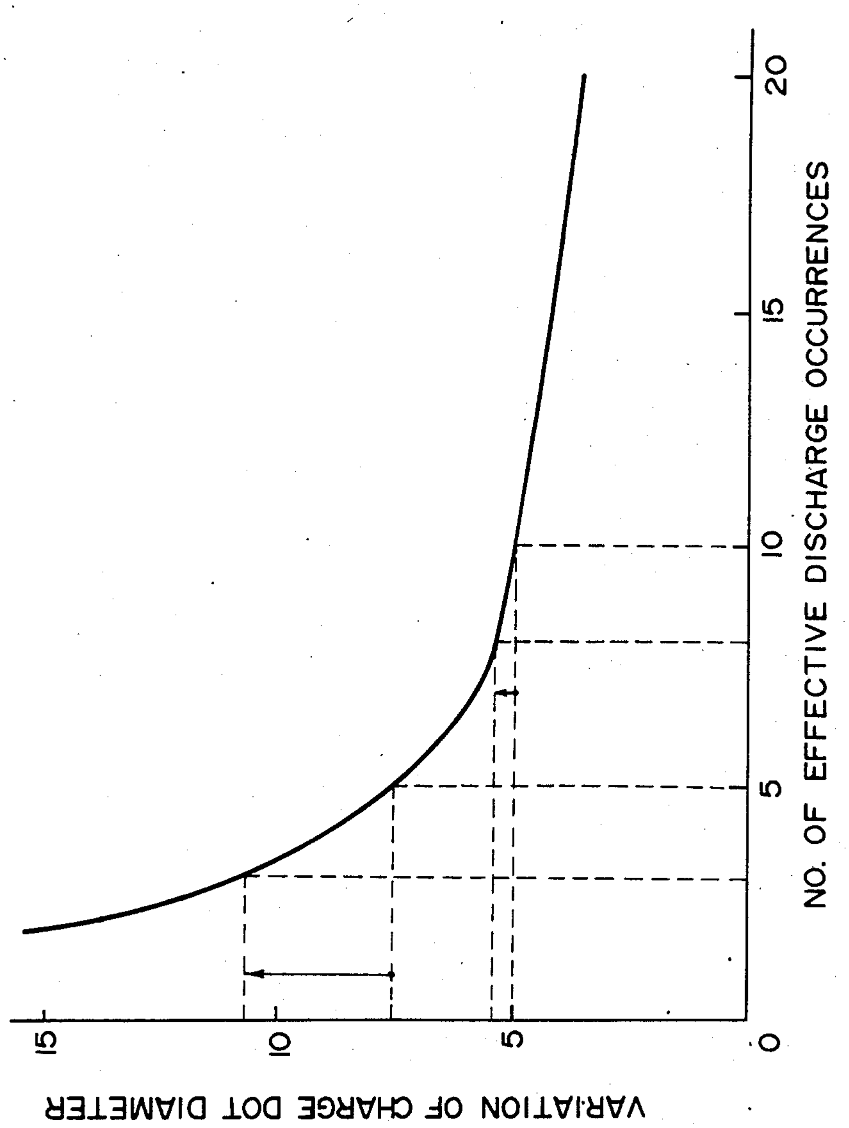
FIG. 8 is a graph showing a relation between variation of charge dot diameter and effective number of ion generations.

FIG. 8 is a graph indicating this relation, from which it is found that the charge dot size variation decreases with increase of the number of effective discharge occurrences, and it is noted that the rate of decrease is not rectilinear.

On the other hand, it has further been found that, even if the device is designed so that a certain number of the effective discharges occur per one charge dot, the number of effective discharges which actually occur is not always equal to the designed number, that is, "misfire" or "misfires" exist. In other words, the number of actual effective discharge (or ion generation) occurrences is not always equal to the number of occurrences of effective dischargeable voltage, which is the voltage with which the discharge of the desired polarity is supposed to take place. It has been confirmed that one to three misfires can occur per one dot.

The influence of the misfire will be considered. Assuming that the number of occurrences of effective dischargeable voltage is set to be five. If two misfires occurs, that is, if only three effective discharges occur, the variation increases up to 11 microns from 7.5 microns which is the variation without misfire, as shown by an arrow in FIG. 8. This increase of variation significantly decreases by increasing the number of effective dischargeable voltage occurrences so as to be not less than 10, as indicated by an arrow. This is based on the finding that the relation between the charge dot size variation and the number of effective discharge occurrences is not rectilinear but is a curve as shown in FIG. 8. When the number of the effective dischargeable voltage occurrences is set to be 10, two misfires result in very small change in the variation as indicated by an arrow in FIG. 8. This improvement is further enhanced by increasing the number to be not less than 15.

Next, the frequency of the alternating voltage will be explained to provide the not less than 10 occurrences of the effective dischargeable voltage. In this embodiment, an alternating voltage having the frequency of 3 MHz is applied between the first electrodes 11 and the second electrodes 12. Facing the bottom surface of the recording head, a chargeable member (not shown) is disposed opposed to the third electrode 13. The chargeable member moves at a speed of 12 inch/sec. The first electrode 11 includes 16 elongated electrodes, and the alternating voltage is sequentially applied to the respective first electrodes 11 in a time-shared manner. In this embodiment, the dot latent image density is 300 dots/inch, and therefore, the time required for writing one dot is $1/(300\times12\times16)=17.4$ microseconds.

It is not the fact that simultaneously with the application of the alternating voltage between the first electrode 11 and the second electrode 12, the voltage reaches a dischargeable level, but the fact that a time period $Tr_1$ is required for the rise of the voltage to the dischargeable level. Similarly, a time period $Tf_1$ is required for the lowering of the voltage. The rising time $Tr_1$ is approximately 2 microseconds, while the lowering time $Tf_1$ is approximately 8 microseconds. Therefore, the period of time during which the effective discharge can occur is $17.4-2-8=7.4$ microseconds. Since the frequency of the alternating voltage is 3 MHz as mentioned before, there are $3\times7.4\times2=44$ peaks of the alternating voltage within the 7.4 microseconds, including positive and negative peaks. However, one of the two peaks within one period, that is, the peak when the first electrode is positive with respect to the third electrode 13, does not generate the discharge effective for the latent image formation.

Figure 6:
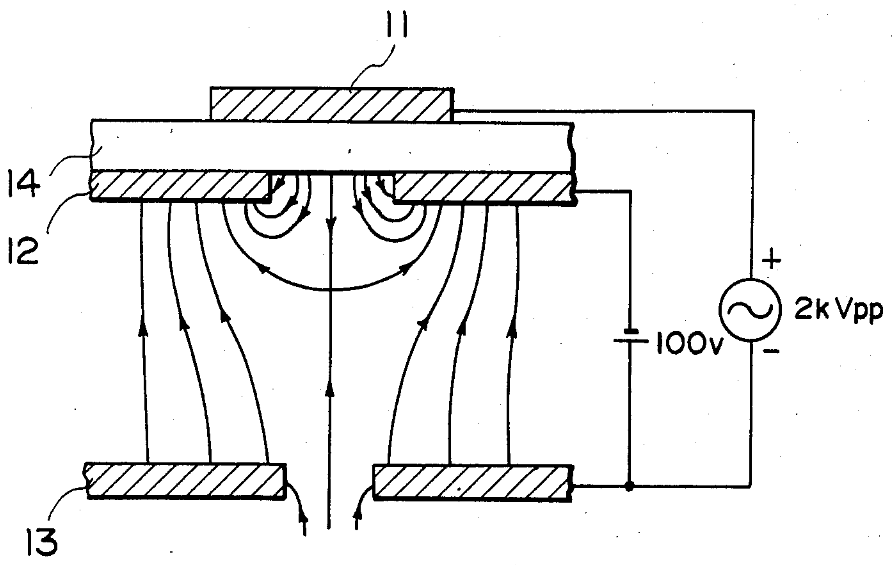
FIGS. 6 and 7 are sectional views of the recording head illustrating the polarity of ions reaching the recording surface.
Figure 7:
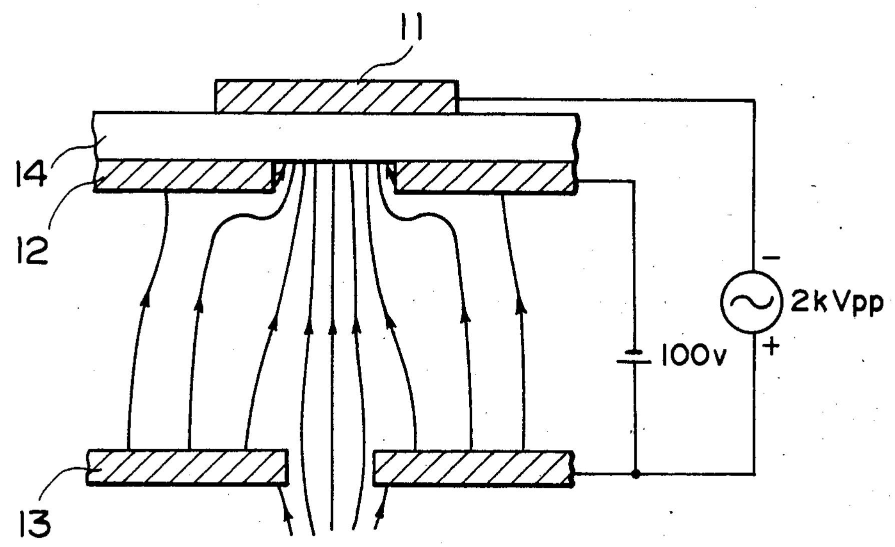

FIGS. 6 and 7 illustrate this, wherein the voltage of the first electrode 11 is +1000 V with respect to the third electrode 13 (FIG. 6), and −1000 V (FIG. 7). In those Figures, electric lines of force are shown when those voltages are applied. It is understood that the negative ions produced in the neighborhood of the discharge region are all absorbed by the surface of the first dielectric member 14 in FIG. 6. For this reason, the number of discharges usable for one dot latent image is $44/2=22$.

The frequency of the alternating voltage will be described. In order to satisfy not less than 10 ion productions per one charge dot, the frequency f of the alternating voltage meets:

$$10/[1/(Vp\times n\times P)-Tr_1-Tf_1]\leqq f$$

where Vp is the relative speed of the recording member, n is a number of times of the time-sharing, P is the number of dots formable per unit length of the recording member, $Tr_1$ is the time required for the voltage to reach the dischargeable voltage, that is, the time from the initial application of the amplitude of the alternating voltage to the actual generation of the effective ions, $Tf_1$ is the time required from the stoppage of the effective ion generation, that is, from the dischargeable voltage to zero amplitude of the alternating voltage.

Figure 5:
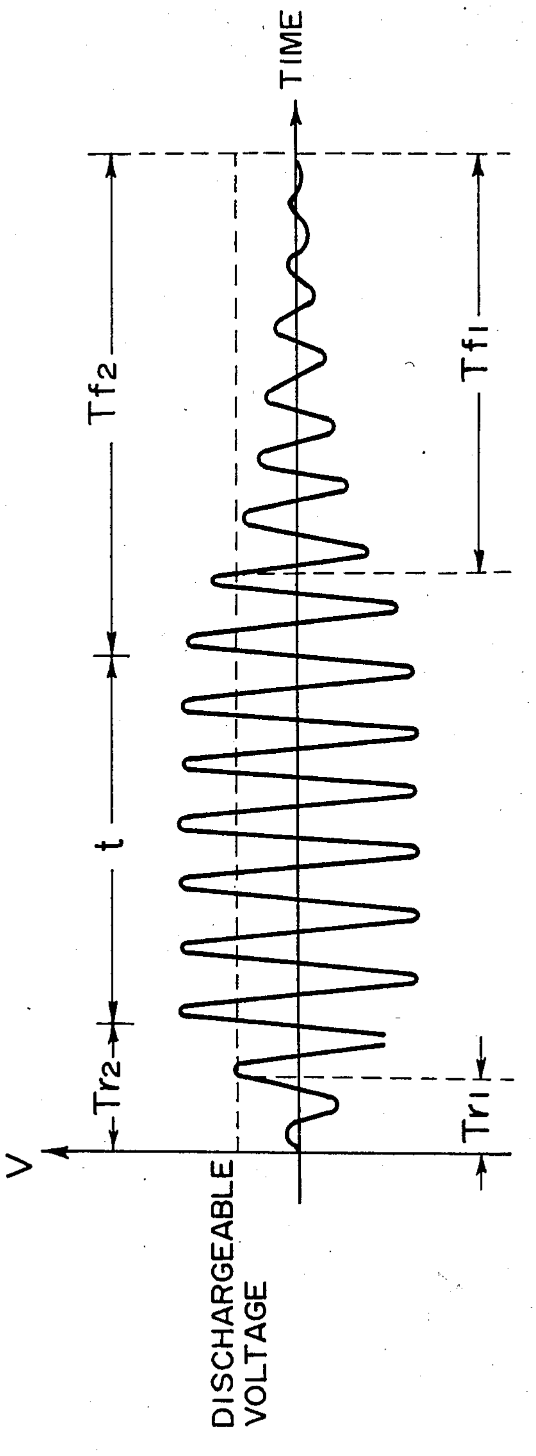
FIG. 5 is a graph indicating an alternating voltage applied for a formation of one dot.

It is further preferable that discharging operations of not less than 10 times occur during the period t as shown in FIG. 5, within which the alternating voltage is constant, since then the influence of the non-uniform discharging is further reduced. In order to accomplish this, the following is satisfied:

$$10/[1/(Vp \times n \times P) - Tr_2 - Tf_1] \leqq f$$

where $Tr_2$ is the rising time required for the voltage to reach to the constant voltage, and $Tf_2$ is the lowering time period required for reaching zero amplitude from the constant voltage.

In this embodiment, Vp=12 inch/sec., n=16, P=300 dots/inch, Tr=2 microseconds, Tf=8 microseconds, and therefore, the frequency f satisfies f≧1.4 MHz.

On the other hand, a certain period of time is required for the produced ions to reach the aperture 17 of the third electrode 13 from the place of ion production. It has been found that the ions do not reach to the aperture 17 when the applied voltage has a frequency higher than that corresponding to this frequency. It is considered that this is because the switching between the electric field of FIG. 6 and that of FIG. 7 is too quick for the ions to be accelerated downwardly in this FIGURE. It is, therefore, preferable that the frequency f satisfies f≦1/T, where T is the time required for the ions produced adjacent to the second electrode 12 to reach to the aperture 17. According to the experiments conducted by the inventors, the time T is approximately 0.2 microseconds. In view of this, it is preferable that the frequency f is not more than 5 MHz.

As previously described, by setting the number of effective dischargeable voltage occurrences to be not less than 10, the variation of the charge dot size is stabilized. However, the variation within a certain range still exists. The inventors have found that the variation of the dot size is expanded when it is developed. The inventors have found through various experiments that the variation of the developed image is substantially the same as that of the charge dot if one half of the average particle diameter of the developer is within the variation of the dot diameter. In consideration of the results with respect to the limiation of the variation in the charge dot diameter, it results that the average particle diameter of the developer is preferably not more than 10 microns when the number of the effective dischargeable voltage occurrences is 10 times, and further preferably not more than 8 microns when the number is 15.

It has been further found that the flow of the ions produced by the recording head to the recording member is diverged toward the surface of the recording member. In the electrostatic recording apparatus using the recording head known in the above mentioned U.S. Pat. Nos. 4,155,093, 4,160,257 and 4,267,556, the ions are diverged toward the recording surface, with the result that the resolution of the recording member is not high.

Figure 9:
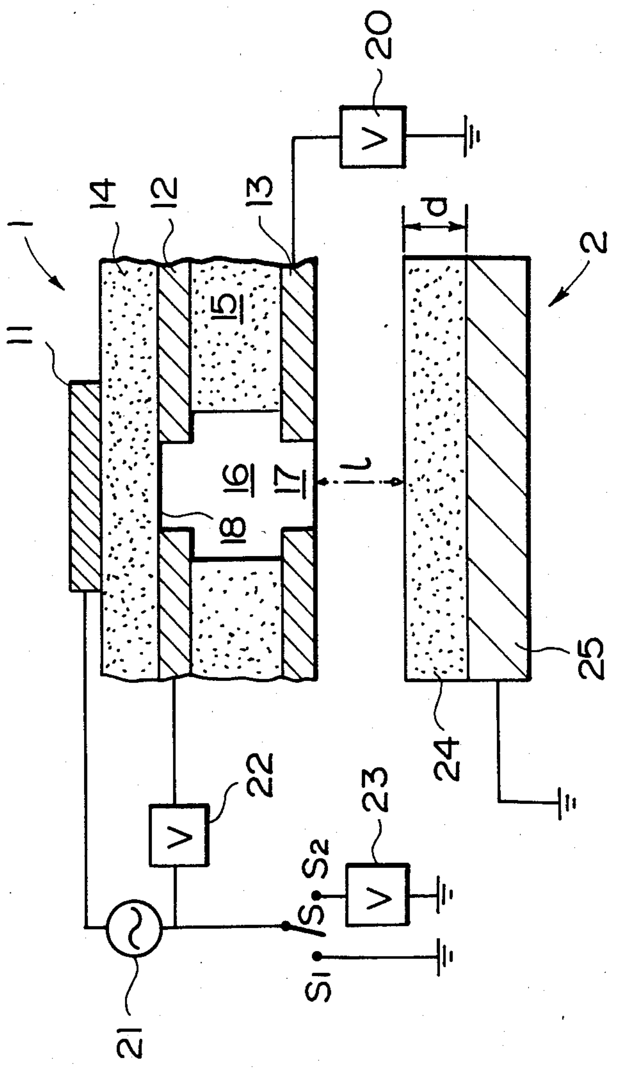
FIG. 9 is a sectional view of a recording head illustrating a distance from the recording head and the recording surface.

In order to provide a high resolution image, it has been found that the considerations should be made as to the diameter of the apertures of the third electrode, the distance 1 between the third electrode 13 and the recording surface 24 (FIG. 9), the voltage Vs applied to the third electrode 13, the maximum surface potential Vd of the recording surface opposed to the third electrode.

Firstly, the diameter of the third electrode apertures will be considered. In order to obtain a high resolution image, the aperture diameter should not be very large. In order to provide the resolution of 300 dots/inch or more, the diameter of the aperture is less than 150 microns. If the radius is larger than this, the diameter of the charge dot is large even if the divergence of the ion flow is limited, with the result that the high resolution image is not formed.

However, the inventors have found that if the aperture of the third electrode 13 is smaller than a certain level, the ions are not generated, and that it is preferable that the radius of the aperture is not less than 60 microns.

Figure 10:
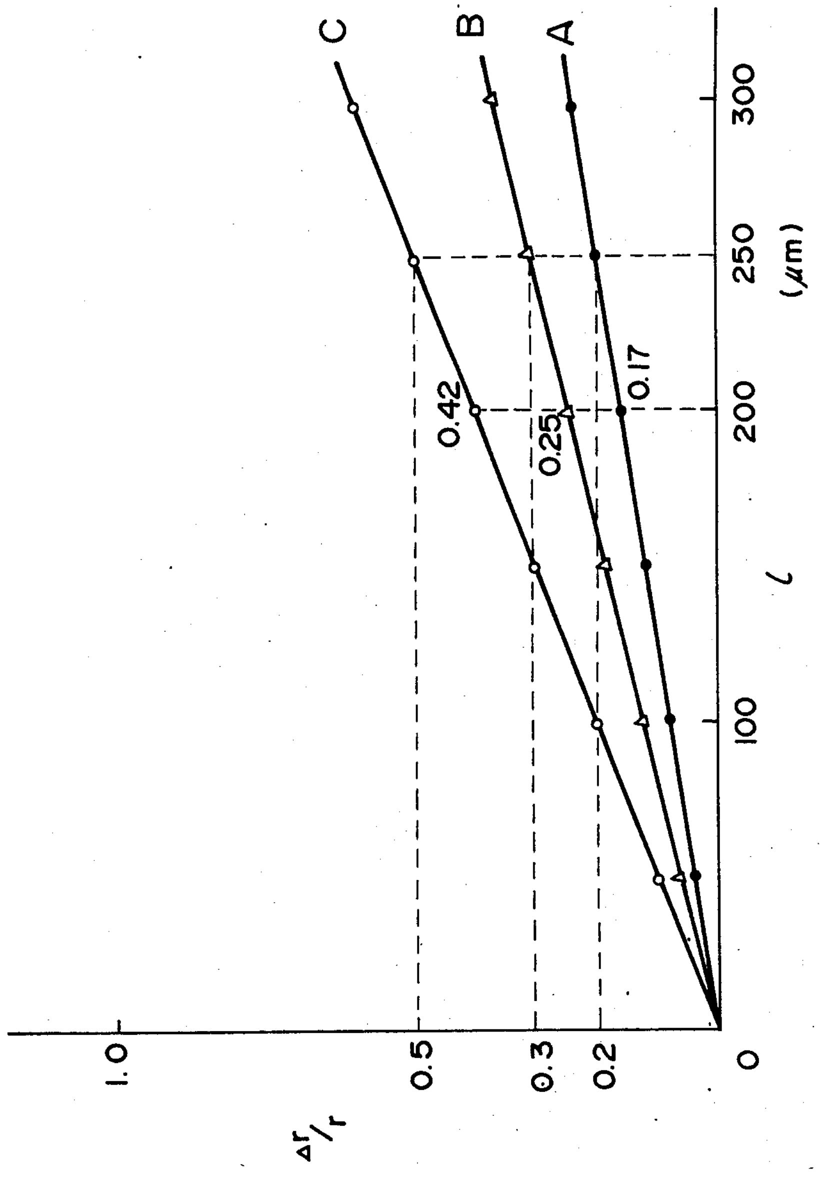
FIG. 10 is a graph showing a relation between a distance between the recording head and the recording surface and a divergence of ions.

FIG. 10 shows the relation between the distance 1 between the third electrode and the recording surface and expansion Δr of the diameter of the dot under the condition that the electric field strength in the space between the third electrode 13 and the recording surface 24 is constant. The expansion is indicated by Δr/r, where r is the diameter of the aperture 17 of the third electrode 13. The curve indicated by A shows the relation when the diameter of the aperture 17 is 150 microns, B when the diameter is 100 microns, and C when the diameter is 60 microns. The ratio of expansion Δr/r will be explained. It is most desirable that the expansion ratio Δr/r is zero in order to obtain a high resolution image. As will be understood from FIG. 10, the distance 1 must be zero in order to make the expansion ratio zero, which is not practical. The inventors have found through various experiments that there is no practical problem if the expansion ratio Δr/r is not more than 0.5.

It has also be found that if the aperture diameter is large, for example 150 microns, the expansion ratio Δr/r of 0.5 means that Δr is 75 microns, which is too large to obtain a high resolution image. Taking the expansion Δr alone, various experiments have been conducted, and the result is that there is no practical problem if Δr is not more than 30 microns, and it is preferable to further improve the resolution that Δr is not more than 25 microns.

In FIG. 10, in order to satisfy Δr/r is not more than 0.5, and that Δr is not more than 30 microns, the expansion ratio Δr/r is not more than 0.2 in the curve A, 0.3 in the curve B and 0.5 in the curve C. As will be understood from FIG. 10, in order to satisfy those conditions, the distance 1 is not more than 250 microns. In order to satisfy the further preferable condition that Δr is not more than 25 microns, the expansion ratio Δr/r is not more than 0.17 in the curve A, 0.25 in the curve B and 0.42 in the curve C. To meet this, 1 is not more than 200 microns.

The inventors have further found that the expansion of the dot or ion flow is a function of |Vs-Vd|/1.

Figure 11:
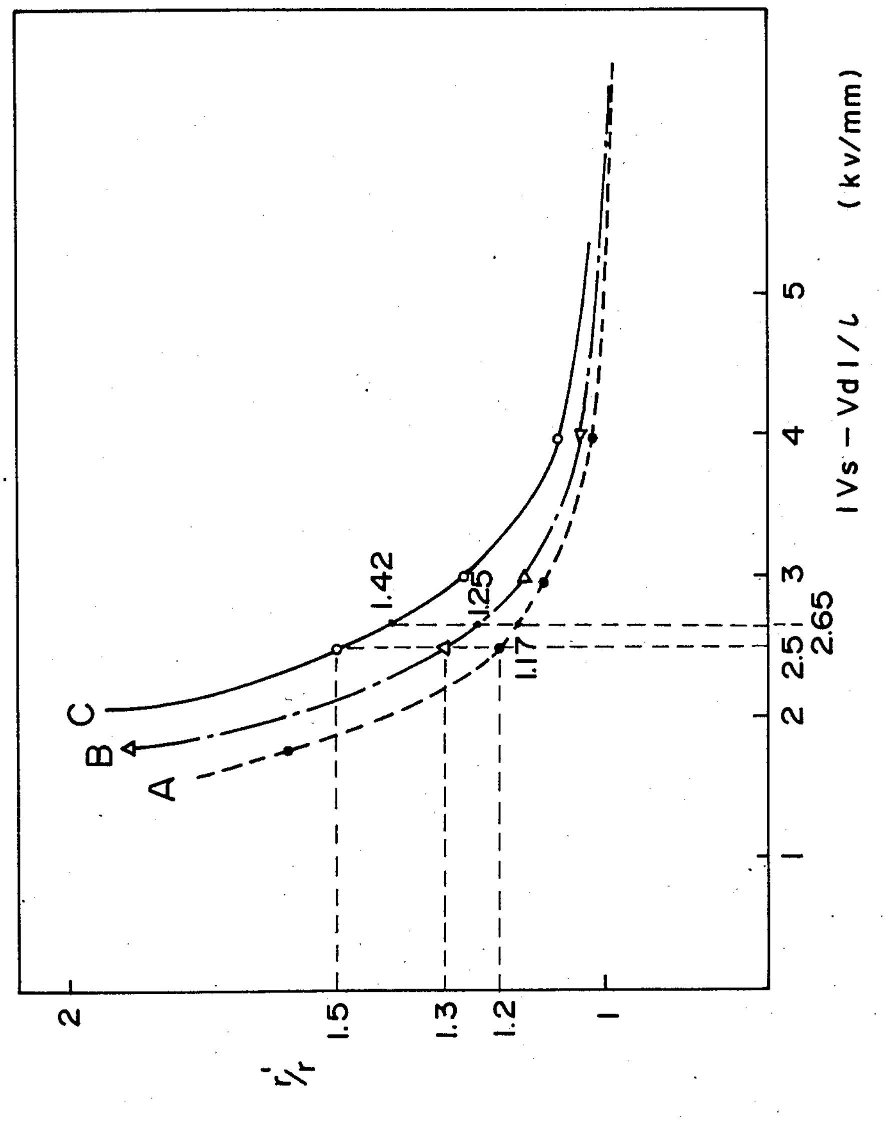
FIGS. 11 and 12 are graphs showing relations among $|VS-VD|/L$, a diameter of the charge dot on the recording surface and the diameter of the aperture of a third electrode.

FIG. 11 shows the relation between the diameter ratio r'/r, that is, the ratio of the diameter of the charge dot and the diameter of the aperture 17, under the condition that the distance 1 is constant, 0.25 mm ($r' = r + \Delta r$). In this case, it is preferable as explained in conjunction with FIG. 10, that the expansion ratio Δr/r is not more than 0.5, namely the diameter ratio r'/r is not more than 1.5, and that the expansion Δr is not more than 30 microns, namely r' is not more than (r+30)

microns. In order to satisfy those conditions, the diameter ratio r'/r is not more than 1.2 in the curve A, 1.3 in the curve B and 1.5 in the curve C. From FIG. 14, it is understood that those conditions are satisfied when $|Vs-Vd|/\mathbf{1}$ is not less than $2.5\times10^3$ (V/mm). The further preferable condition is that $\Delta r$ is not more than 25, that is, r' is not more than (r+25) microns, the diameter ratio r'/r is not more than 1.17 in the curve A, 1.25 in the curve B and 1.42 in the curve C. From this, it is preferable that $|Vs-Vd|/\mathbf{1}$ is not less than $2.65\times10^3$ (V/mm).

Figure 12:
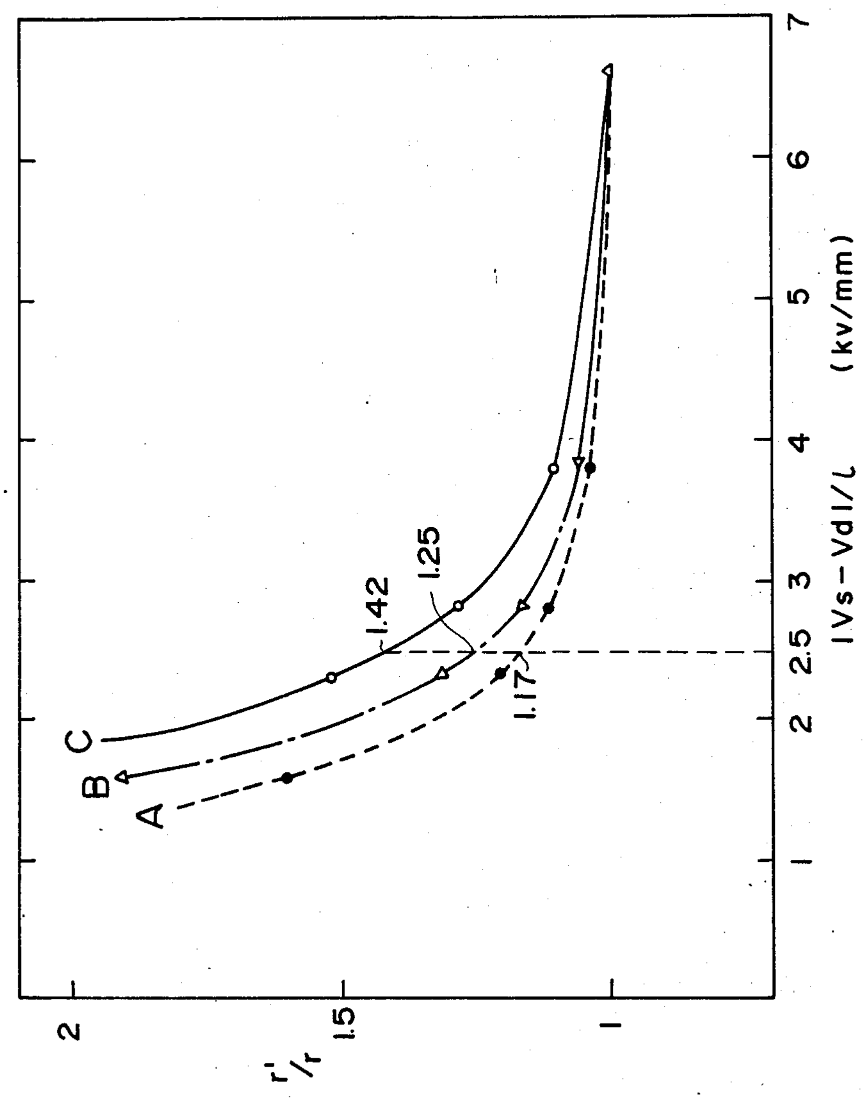
Figure 13:
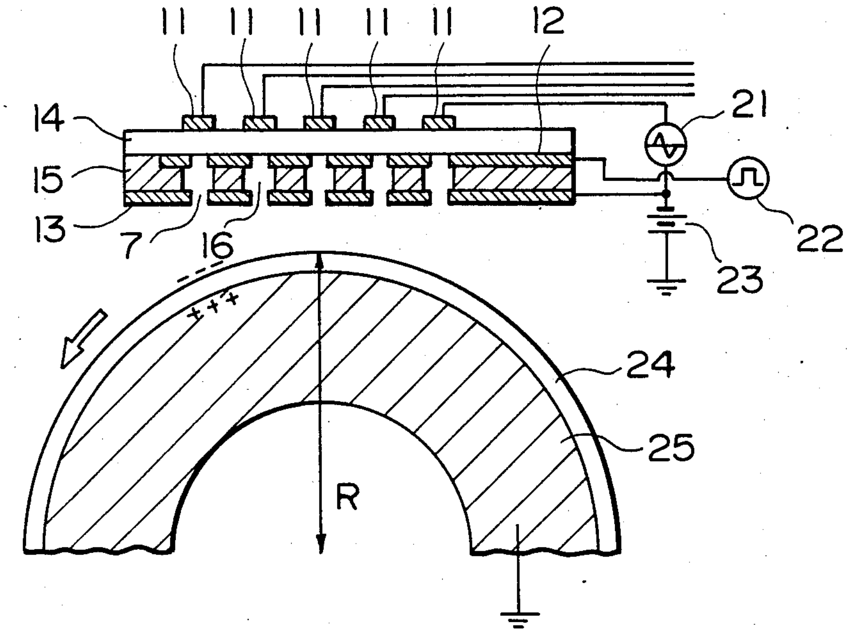
FIG. 13 is a sectional view of the recording head used with a recording member.

FIG. 12 is the graph similar to that of FIG. 11, but the constant distance 1 is 0.2 mm. In order to satisfy $\Delta r$ is not more than 25 microns, the diameter ratio r'/r is not more than 1.17 in the curve A, 1.25 in the curve B and 1.42 in the curve C. From this, it is confirmed that the limitation $|Vs-Vd|/\mathbf{1}$ is not less than $2.5\times10^3$ (V/mm) is sufficient to satisfy the above described conditions.

From the foregoing, the charge dot on the recording surface is rendered even smaller than that of the conventional dot, and therefore, the high resolution image can be provided, when the following is satisfied:

$|Vs-Vd|/\mathbf{1}\geqq2.5\times10^3$ (V/mm), $\mathbf{1}\leqq0.25$ mm, and $r\leqq150$ microns.

The voltage Vs applied to the third electrode 13 will be described. If the voltage |Vs| is too large, it is possible that the discharge occurs between the third electrode 13 and the recording surface 24 with the result of impossible latent image formation, and that the third electrode 13 and the recording surface 24 are damaged. To avoid this, it is preferable that $|Vs|/(P\times\mathbf{1})$ (P is the ambient pressure (Torr)) is not more than a predetermined level. In the field of electrostatic recording, and also, in the field of a printer or a copying machine, the apparatus is to be operated reliably under the condition of 600 Torr. Assuming that P=600 Toor, and 1=0.25 mm, |Vs| is preferably not more than 1.5 KV, since the above described discharge between the third electrode 13 and the recording surface 24 can be positively prevented. Because the distance 1 is preferably not more than 0.25 as described above, the voltage applied to the third electrode |Vs| is preferably not more than 1.5 KV.

The description will be made with respect to the maximum surface potential Vd of the charge pattern by the charge dots. In order to provide a high resolution image, it is desired that the distance 1 between the third electrode 13 and the recording surface 24 is as small as possible. However, when the distance 1 is made smaller, the voltage applied to the third electrode |Vs| must be made smaller, too. As a result, the electric field strength by the voltage Vd is significantly decreased. When, for example, 1 is 0.15 mm, the electric field strength limit is 1.1 KV. In the actual device, however, it is necessary to pay consideration to the variation of the clearance between the third electrode 13 and the recording surface 24, and therefore, it is required that the discharge between the third electrode and the recording member 2 is sufficiently prevented under the condition of 1=0.1-0.2 mm. In order to meet this requirement, it is preferable that the voltage |Vs| is less than 800 V. Assuming that the maximum potential Vd between the dielectric layer 24 and the conductive layer 25 by the charge image formed on the recording member 2 is −400 V, $|Vs-Vd|/\mathbf{1}<2$ KV/mm (in the area 1=0.2 mm), with the result that the high resolution image might possibly not be provided, for the reasons described in the foregoing. Therefore it has been found that it is preferable that the voltage Vd is lower, in order to decrease the distance 1 with the view to providing a high resolution means. The various experiments and considerations by the inventors have revealed that it depends on the thickness of the dielectric layer of the recording surface (d mm), the relative dielectric constant thereof ($\epsilon$), the charge density ($\sigma$c/mm) of the charge image, and reversed that the voltage |Vd| can be decreased if the following is satisfied:

$$d\leqq1.8\times10^{-12}\times\epsilon/\sigma.$$

Actually, the voltage |Vd| is not more than 200 V, and the distance 1 can be decreased, and a further high resolution means can be provided.

As described, the expansion of the ions can be limited, and a high resolution image can be provided, if the following is satisfied:

$r\leqq150$ microns, $\mathbf{1}\leqq0.25$ mm, and $|Vs-Vd|/\mathbf{1}\geqq2.5\times10^3$ V/mm.

The problems will be described, when the recording surface is curved. It has been difficult to provide a high resolution pattern when the recording medium, that is, the solid dielectric member is in the form having a curvature, such as a cylinder, using the method and device disclosed in U.S. Pat. Nos. 4,155,093, 4,160,257 and 4,267,556.

The inventors have investigated to find the causes of this, and revealed that the sizes of the dots which are to be the same are different between the central portion and the marginal portion of the recording head. This is a significant cause of preventing the high resolution image formation. The inventors further investigated and found that the high resolution image can be provided if the ratio a of the dot diameter between the dot in the central portion and that of the marginal portion is not more than 1.5. Further, various experiments and considerations in a trial and error manner by the inventors, have concluded that by satisfying the following, the above ratio a may be made not more than 1.5:

$$p\times R^{\frac{1}{2}}/[m(n-1)]\geqq1.6$$

where n is the number of time sharing of the first electrode 1, that is, the number of the lines of the first electrode 1, p is the picture element density (dots/mm), R is the radius of curvature of the recording surface 24 (mm), and m is the distance between adjacent first electrodes 1 (dots). Namely, if this is satisfied, the above dot diameter ratio is not more than 1.5.

The following is the result of the experiments, wherein $q=p\times R^{\frac{1}{2}}/[m(n-1)]$.

| | | | |
|---|---|---|---|
| | p = 20 r = 60 | | |
| m = 6 | n = 20 | q = 1.36 | a = 1.90 |
| m = 5 | n = 20 | q = 1.63 | a = 1.42 |
| m = 4 | n = 20 | q = 2.03 | a = 1.20 |
| | p = 20 r = 50 | | |
| m = 7 | n = 16 | q = 1.35 | a = 2.10 |
| m = 6 | n = 16 | q = 1.57 | a = 1.60 |
| m = 5 | n = 16 | q = 1.88 | a = 1.25 |
| | p = 20 r = 35 | | |
| m = 6 | n = 16 | q = 1.31 | a = 2.00 |
| m = 5 | n = 16 | q = 1.58 | a = 1.51 |
| m = 4 | n = 16 | q = 1.97 | a = 1.22 |
| | p = 20 r = 30 | | |
| m = 5 | n = 16 | q = 1.46 | a = 1.71 |
| m = 4 | n = 16 | q = 1.83 | a = 1.28 |
| m = 3 | n = 16 | q = 2.40 | a = 1.15 |

-continued

| | | | |
|---|---|---|---|
| | p = 16 r = 60 | | |
| m = 6 | n = 16 | q = 1.38 | a = 1.57 |
| m = 5 | n = 16 | q = 1.65 | a = 1.32 |
| m = 4 | n = 16 | a = 2.07 | a = 1.16 |
| | p = 16 r = 60 | | |
| m = 5 | n = 20 | q = 1.30 | a = 1.68 |
| m = 4 | n = 20 | q = 1.63 | a = 1.33 |
| m = 3 | n = 20 | q = 2.17 | a = 1.15 |
| | p = 16 r = 50 | | |
| m = 6 | n = 16 | q = 1.26 | a = 1.85 |
| m = 5 | n = 16 | q = 1.51 | a = 1.51 |
| m = 4 | n = 16 | q = 1.89 | a = 1.20 |
| | p = 16 r = 30 | | |
| m = 4 | n = 16 | q = 1.46 | a = 1.53 |
| m = 3 | n = 16 | q = 1.95 | a = 1.19 |
| m = 2 | n = 16 | q = 2.92 | a = 1.08 |
| | p = 16 r = 50 | | |
| m = 3 | n = 20 | q = 1.98 | a = 1.18 |
| m = 4 | n = 16 | q = 1.88 | a = 1.20 |
| m = 6 | n = 12 | q = 1.71 | a = 1.27 |

As will be understood, by satisfying the above described requirement, the diameter ratio a is not more than 1.5 so that the high resolution image can be provided.

Figure 14:
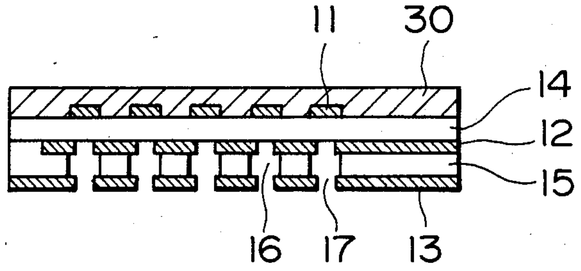
FIG. 14 is a sectional view of a recording head according to an embodiment of the present invention.

FIG. 14 illustrated another embodiment of the present invention.

As will be understood from the foregoing description, the distance between the adjacent first electrodes are preferably small. However, if this distance is too small, there is a possibility that dielectric break down can occur. In this embodiment, in order to solve this problem, there is provided an insulating resin layer 30 of a material having high resistance to provide an insulating layer, insulativeness, such as silicone material or epoxy material in order to solve this problem.

When the distance between the adjacent electrodes were set to be 0.03 mm; a silicone resin was applied; and thereafter a sine wave voltage was applied with 1 MHz and 2 KVpp, then it was recognized that the dielectric break down occurred between a first electrode 1 and the adjacent electrode 1 during the voltage application. However, when the distance between the adjacent electrodes was increased up to 0.05 mm, no dielectric break down occurred. Various experiments and considerations have concluded that when the insulating resin layer 24 is provided, it is preferable to satisfy:

$$d \geqq 4 \times 10^{-5} \times Vp$$

where d is the distance between the adjacent first electrodes (mm), and Vp is a peak voltage of the alternative voltage.

By determining the distance between the adjacent electrodes and the alternating voltage so as to satisfy the above, the possibility of the dielectric break down is almost completely eliminated. By such determination, the distance between the adjacent first electrodes can be reduced, so that the high resolution image can be formed.

Figure 15:
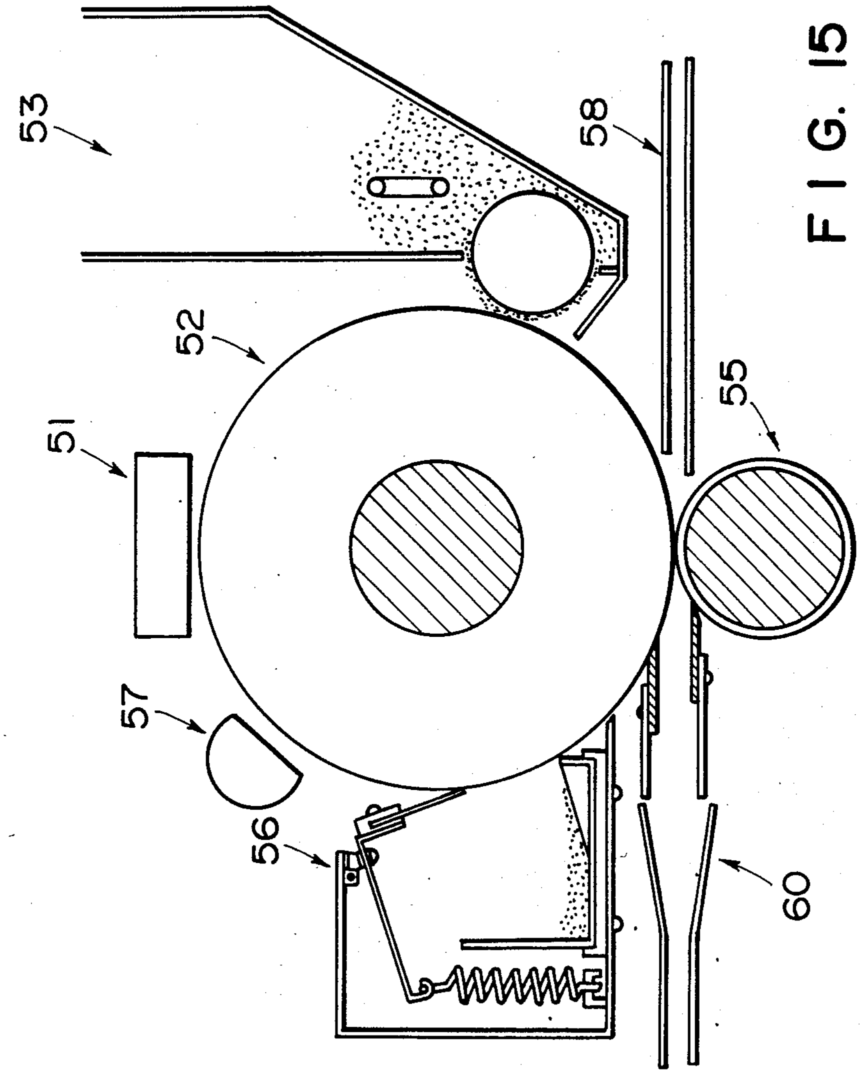
FIG. 15 is a somewhat schematic electrostatic recording apparatus according to an embodiment of the present invention.

FIG. 15 illustrates an example of an electrostatic recording apparatus using the recording head described in the foregoing. The recording head or an ion generator of the present invention is designated by the reference numeral 51. By this ion generator 51, an electrostatic latent image is formed on the recording member 51 in accordance with electric signals not shown. The electrostatic latent image thus formed is developed by a developing device 53 using a conductive toner. The developed image is transferred onto an unshown transfer material fed along a guide 58. The image transfer is effected by the pressure applied between the recording member 52 and a transfer roller 55. The transfer material on which the image has been transferred is separated from the transfer roller 55 and the recording member 52, and then it is discharged along the discharging guide 60.

The recording member 52 from which the image has been transferred is cleaned by the cleaning device 56 for the preparation of the next image recording, so that the residual toner is removed therefrom, and then the recording member 22 is uniformly discharged by the discharger 57.

As described in the foregoing, according to the present invention, a high resolution and high quality image can be provided by satisfying various conditions for the parameters described above. The limitations to the parameters are effective, respectively, but they may be satisfied in combination.

While the invention has been described with reference to the structures disclosed herein, it is not confined to the details set forth and this application is intended to cover such modifications or changes as may come within the purposes of the improvements or the scope of the following claims.

What is claimed is:

1. An electrostatic recording apparatus, comprising:

a recording member having a surface on which an electrostatic latent image is formed;

a recording head, opposed to the recording surface of said recording member, for forming the electrostatic latent image thereon, said recording head comprising a plurality of first electodes extending in a first direction, a plurality of second electrodes extending in a second direction crossing with said first direction to form a matrix with said first electrodes, a third electrode disposed across said second electrodes from said first electrodes and having first apertures of allowing ions to pass, a first dielectric member between said first electrodes and said second electrodes and a second dielectric member disposed between said second electrodes and said third electrode and having second apertures for allowing the ions to pass;

alternating voltage applying means for applying an alternating voltage between said first electrodes and said second electrodes to effect discharging to produce the ions;

first bias voltage applying means for applying a bias voltage to said second electrode; and second bias voltage applying means for applying to said third electrode a bias voltage having the same polarity as that of the bias voltage applied to said second electrodes and having an absolute voltage which is smaller than that of the bias voltage applied to said second electrode;

wherein parameters of said means are so determined that the ions produced by said recording head and moved to the recording surface are controlled so as to provide a high resolution image.

2. An apparatus according to claim 1, wherein number of occurrences of effective dischargeable voltages per one charge dot is not less than 10.

3. An apparatus according to claim 1 or 2, wherein a distance 1 (mm) between the recording surface and said third electrode, the bias voltage Vs (V) to said third electrode, a maximum surface potential Vd (V) of the recording surface in the area opposed to said recording head satisfy the relationships, $2.5\times10^3 \leqq |Vs-Vd|/l$, and $l \leqq 0.25$, wherein a diameter of the apertures of said third electrode is not more than 0.15 mm.

4. An apparatus according to claim 1 or 2, wherein number n of time sharing for operating said first electrodes, a picture element density of recording p (dots/mm), a radius of curvature of the recording surface R (mm) and a distance m (mm) between adjacent first electrodes, satisfy a relationship, $p\times R^{\frac{1}{2}}/m(n-1)] \geqq 1.6$.

5. An apparatus according to claim 3, wherein number n of time sharing for operating said first electrodes, a picture element density of recording p (dots/mm), a radius of curvature of the recording surface R (mm) and a distance m (mm) between adjacent first electrodes, satisfy a relationship, $p\times R^{\frac{1}{2}}/m(n-1)] \geqq 1.6$.

6. An electrostatic recording method, comprising:

providing a recording head including a plurality of first electrodes extending in a first direction, a plurality of second electrodes extending in a second direction crossing with said first direction to form a matrix with said first electrodes, a third electrode disposed across said second electrode from said first electrode and having apertures for allowing ions to pass;

applying an alternating voltage between selected one of said first electrodes and a selected one of said second electrodes to produce ions adjacent a crossing point of the matrix corresponding to the selection;

providing a potential difference between said second electrodes and said third electrodes;

providing a potential difference between said third electrode and a recording surface to control an electrostatic latent image to be formed on the recording surface with charge dots;

controlling said first electrodes and said second electrodes between which said an alternating voltage is applied;

wherein number of occurrences of effective dischargeable voltages per one charge dot is not less than 10.

7. A method according to claim 6, wherein number of occurrences of effective dischargeable voltages per one charge dot is not less than 15.

8. A method according to claim 6, wherein a frequency of the alternating voltage f satisfies the relationship, $f \geqq 10/[1/(Vp\times n\times P)-Tr_1-Tf_1]$ where Vp is a relative speed between the recording surface and said recording head, n is number of time sharing for operation of said first electrodes, $Tr_1$ is a time period required for the voltage to reach a dischargeable level for generating ions, $Tf_1$ is a time period required for the voltage to restore, and P is number of dots formed on the recording surface per unit length thereof.

9. A method according to claim 6, wherein a frequency of the alternating voltage f satisfies the relationship, $f \geqq 10/[1/(Vp\times n\times P)-Tr_2-Tf_2]$ where Vp is a relative speed between the recording surface and said recording head, n is number of time sharing for operation of said first electrodes, $Tr_2$ is a time period required for the alternating voltage to reach a stabilized state, $Tf_2$ is a time period required for the alternating voltage to reach to the state of 0 amplitude from the stabilized state, and P is number of dots formed on the recording surface per unit length thereof.

10. A method according to claim 6, wherein said alternating voltage has a frequency not more than 5 MHz.

11. A method according to claim 6, wherein an average particle diameter of the developer is not more than 10 microns.

12. An electrostatic recording apparatus, comprising:

a recording member having a surface on which an electrostatic latent image is formed;

a recording head, opposed to the recording surface of said recording member, for forming the electrostatic latent image thereon, said recording head comprising a plurality of first electodes extending in a first direction, a plurality of second electrodes extending in a second direction crossing with said first direction to form a matrix with said first electrodes, a third electrode disposed across said second electrodes from said first electrodes and having first apertures of allowing ions to pass, a first dielectric member between said first electrodes and said second electrodes and a second dielectric member disposed between said second electrodes and said third electrode and having second apertures for allowing the ions to pass;

alternating voltage applying means for applying an alternating voltage between said first electrodes and said second electrodes;

first bias voltage applying means for applying a bias voltage to said second electrode;

second bias voltage applying means for applying a bias voltage to said third electrode;

developing means for developing with a developer the electrostatic latent image formed on the recording surface by electric charge dots;

means for transferring a developed image developed by said developing means onto a recording material; and means for fixing an image transferred by said transferring means on the recording material;

wherein number of occurrences of effective dischargeable voltages is not less than 10.

13. An apparatus according to claim 12, wherein number of occurrences of effective dischargeable voltages per one charge dot is not less than 15.

14. An apparatus according to claim 12, wherein a frequency of the alternating voltage f satisfies the relationship, $f \geqq 10/[1/(Vp\times n\times P)-Tr_2-Tf_2]$ where Vp is a relative speed between the recording surface and said recording head, n is number of time sharing for operation of said first electrodes, $Tr_2$ is a time period required for the alternating voltage to reach a stabilized state, $Tf_2$ is a time period required for the alternating voltage to reach to the state of 0 amplitude from the stabilized state, and P is number of dots formed on the recording surface per unit length thereof.

15. An apparatus according to claim 12, wherein a frequency of the alternating voltage f satisfies the relationship, $f \geqq 10/[1/(Vp\times n\times P)-Tr_1-Tf_1]$ where Vp is a relative speed between the recording surface and said recording head, n is number of time sharing for operation of said first electrodes, $Tr_1$ is a time period required for the voltage to reach a dischargeable level for generating ions, $Tf_1$ is a time period required for the voltage to restore, and P is number of dots formed on the recording surface per unit length thereof.

16. An apparatus according to claim 12, wherein said alternating voltage has a frequency not more than 5 MHz.

17. An apparatus according to claim 12, wherein an average particle diameter of the developer is not more than 10 microns.

18. An apparatus according to claim 12, wherein there is provided an insulating member covering said first electrodes.

19. An apparatus according to claim 18, wherein a distance m (mm) between adjacent first electrodes and a peak-to-peak voltage Vpp of the alternating voltage satisfy, $m \leqq 4 \times 10^{-5} \times Vpp.$ 20. An apparatus according to claim 12, wherein a distance 1 (mm) between the recording surface and said third electrode, the bias voltage Vs (V) to said third electrode, a maximum surface potential Vd (V) of the recording surface in the area opposed to said recording head satisfy the relationship, $2.5 \times 10^3 \leqq |Vs - Vd|/1.$ 21. An apparatus according to claim 20, wherein an absolute value |Vs| of the bias voltage to said third electrode satisfies a relationship, $|Vs| \leqq 1.5 \times 10^3\ V.$ 22. An apparatus according to claim 21, wherein an absolute value |Vd| of a maximum surface potential of the recording surface of an area opposed to said recording head satisfies a relationship, $|Vd| \leqq 200\ V.$ 23. An apparatus according to claim 22, wherein a distance 1 (mm) between the recording surface and said third electrode satisfies a relationship, $1 \leqq 0.2.$ 24. An electrostatic recording method, comprising:

providing a recording head including a plurality of first electrodes extending in a first direction, a plurality of second electrodes extending in a second direction crossing with said first direction to form a matrix with said first electrodes, a third electrode disposed across said second electrode from said first electrode and having apertures for allowing ions to pass;

applying an alternating voltage between selected one of said first electrodes and a selected one of said second electrodes to produce ions adjacent a crossing point of the matrix corresponding to the selection;

providing a potential difference between said second electrodes and said third electrodes;

providing a potential difference between said third electrode and a recording surface to control an electrostatic latent image to be formed on the recording surface with charge dots;

controlling said first electrodes and said second electrodes between which said an alternating voltage is applied;

wherein a distance 1 (mm) between the recording surface and said third electrode, the bias voltage Vs (V) to said third electrode, a maximum surface potential Vd (V) of the recording surface in the area opposed to said recording head satisfy the relationships, $2.5 \times 10^3 \leqq |Vs - Vd|/1,$ $1 \leqq 0.25,$ wherein a diameter of the apertures of said third electrodes is not more than 0.15 mm.

25. A method according to claim 24, wherein the apertures of said third electrode are in the form of circle corresponding to the matrix formed by said first electrodes and said second electrodes, and wherein a diameter r of the apertures and a diameter r' of charge dots formed on the recording surface through the apertures, satisfy a relationship, $r'/r \leqq 1.5.$ 26. A method according to claim 24, wherein the apertures of said third electrode are in the form of circle corresponding to the matrix formed by said first electrodes and said second electrodes, and wherein a diameter r (mm) of the apertures and a diameter r' (mm) of charge dots formed on the recording surface through the apertures, satisfy a relationship, $r' - r \leqq 0.03.$ 27. A method according to claim 24, wherein a distance 1 (mm) between the recording surface and said third electrode satisfies a relationship, $1 \leqq 0.2.$ 28. A method according to claim 24, wherein a distance 1 (mm) between the recording surface and said third electrode, the bias voltage Vs (V) to said third electrode, a maximum surface potential Vd (V) of the recording surface in the area opposed to said recording head satisfy the relationships, 29. A method according to claim 24, wherein an absolute value |Vs| of the bias voltage to said third electrode satisfies a relationship, $|Vs| \leqq 1.5 \times 10^3\ V.$ 30. A method according to claim 24, wherein a diameter of the apertures of said third electrode is not less than 0.06 mm.

31. A method according to claim 24, wherein the recording surface is of a dielectric material, and wherein a thickness d (mm) of the dielectric member satisfies, $d \leqq 1.8 \times 10^{-12} \times \epsilon/\sigma$ where $\epsilon$ is a relative dielectric constant of the dielectric member, $\sigma$ is charge density of a charge pattern formed on the recording surface with ions from said recording head ($c/mm^2$).

32. An electrostatic recording apparatus, comprising:

a recording member having a surface on which an electrostatic latent image is formed;

a recording head, opposed to the recording surface of said recording member, for forming the electrostatic latent image thereon, said recording head comprising a plurality of first electodes extending in a first direction, a plurality of second electrodes extending in a second direction crossing with said first direction to form a matrix with said first electrodes, a third electrode disposed across said second electrodes from said first electrodes and having first apertures of allowing ions to pass, a first dielectric member between said first electrodes and said second electrodes and a second dielectric member disposed between said second electrodes and said third electrode and having second apertures for allowing the ions to pass;

alternating voltage applying means for applying an alternating voltage between said first electrodes and said second electrodes;

first bias voltage applying means for applying a bias voltage to said second electrode;

second bias voltage applying means for applying a bias voltage to said third electrode;

developing means for developing with a developer the electrostatic latent image formed on the recording surface by electric charge dots;

means for transferring a developed image developed by said developing means onto a recording material; and means for fixing an image transferred by said transferring means on the recording material;

wherein a distance 1 (mm) between the recording surface and said third electrode, the bias voltage Vs (V) to said third electrode, a maximum surface potential Vd (V) of the recording surface in the area opposed to said recording head satisfy the relationships, $2.5\times10^3 \leqq |Vs-Vd|/l$, and $l \leqq 0.25$.

33. An apparatus according to claim 32, wherein the apertures of said third electrode are in the form of circle corresponding to the matrix formed by said first electrodes and said second electrodes, and wherein a diameter r of the apertures and a diameter r' of charge dots formed on the recording surface through the apertures, satisfy a relationship, $r'/r \leqq 1.5$.

34. An apparatus according to claim 32, wherein the apertures of said third electrode are in the form of circle corresponding to the matrix formed by said first electrodes and said second electrodes, and wherein a diameter r (mm) of the apertures and a diameter r' (mm) of charge dots formed on the recording surface through the apertures, satisfy a relationship, $r'-r \leqq 0.03$.

35. An apparatus according to claim 32, wherein a distance 1 (mm) between the recording surface and said third electrode satisfies a relationship, $l \leqq 0.2$.

36. An apparatus according to claim 32, wherein a distance 1 (mm) between the recording surface and said third electrode, the bias voltage Vs (V) to said third electrode, a maximum surface potential Vd (V) of the recording surface in the area opposed to said recording head satisfy the relationships, $2.65\times10^3 |Vs-Vd|/l$, and $l \leqq 0.25$.

37. An apparatus according to claim 32, wherein an absolute value |Vs| of the bias voltage to said third electrode satisfies a relationship, $|Vs| \leqq 1.5\times10^3\ V$.

38. An apparatus according to claim 32, wherein a diameter of the apertures of said third electrode is not less than 0.06 mm.

39. An apparatus according to claim 32, wherein there is provided an insulating member covering said first electrodes.

40. An apparatus according to claim 39, wherein a distance m (mm) between adjacent first electrodes and a peak-to-peak voltage Vpp of the alternating voltage satisfy, $m \geqq 4\times10^{-5}\times Vpp$.

41. An apparatus according to claim 32, wherein the recording surface is of a dielectric material, and wherein a thickness d (mm) of the dielectric member satisfies, $d \leqq 1.8\times10^{-12}\times\epsilon/\sigma$ where $\epsilon$ is a relative dielectric constant of the dielectric member, $\sigma$ is charge density of a charge pattern formed on the recording surface with ions from said recording head (c/mm$^2$).

42. An electrostatic recording method, comprising:

providing a recording head including a plurality of first electrodes extending in a first direction, a plurality of second electrodes extending in a second direction crossing with said first direction to form a matrix with said first electrodes, a third electrode disposed across said second electrode from said first electrode and having apertures for allowing ions to pass;

applying an alternating voltage between selected one of said first electrodes and a selected one of said second electrodes to produce ions adjacent a crossing point of the matrix corresponding to the selection;

providing a potential difference between said second electrodes and said third electrodes;

providing a potential difference between said third electrode and the recording surface to control an electrostatic latent image to be formed on the recording surface with charge dots;

controlling said first electrodes and said second electrodes between which said an alternating voltage is applied;

wherein number n of time sharing for operating said first electrodes, a picture element density of recording p (dots/mm), a radius of curvature of the recording surface R (mm) and a distance m (mm) between adjacent first electrodes, satisfy a relationship, $p\times R^{\frac{1}{2}}/[m(n-1)]1.6$.

43. A method according to claim 42, wherein a ratio of a diameter of charge dots from a marginal portion of said recording head to that from a central portion thereof is not more than 1.5.

44. An electrostatic recording apparatus, comprising:

a recording member having a surface on which an electrostatic latent image is formed;

a recording head, opposed to the recording surface of said recording member, for forming the electrostatic latent image thereon, said recording head comprising a plurality of first electodes extending in a first direction, a plurality of second electrodes extending in a second direction crossing with said first direction to form a matrix with said first electrodes, a third electrode disposed across said second electrodes from said first electrodes and having first apertures of allowing ions to pass, a first dielectric member between said first electrodes and said second electrodes and a second dielectric member disposed between said second electrodes and said third electrode and having second apertures for allowing the ions to pass;

alternating voltage applying means for applying an alternating voltage between said first electrodes and said second electrodes;

first bias voltage applying means for applying a bias voltage to said second electrode;

second bias voltage applying means for applying a bias voltage to said third electrode;

developing means for developing with a developer the electrostatic latent image formed on the recording surface by electric charge dots;

means for transferring a developed image developed by said developing means onto a recording material; and means for fixing an image transferred by said transferring means on the recording material;

wherein number n of time sharing for operating said first electrodes, a picture element density of recording p (dots/mm), a radius of curvature of the recording surface R (mm) and a distance m (mm) between adjacent first electrodes, satisfy a relationship, $p \times R^{\frac{1}{2}}/[m(n-1)]1.6.$

45. An apparatus according to claim 44, wherein a ratio of a diameter of charge dots from a marginal portion of said recording head to that from a central portion thereof is not more than 1.5.

46. An apparatus according to claim 44, wherein there is provided an insulating member covering said first electrodes.

47. An apparatus according to claim 44, wherein a distance m (mm) between adjacent first electrodes and a peak-to-peak voltage Vpp of the alternating voltage satisfy, $$m \geqq 4 \times 10^{-5} \times Vpp.$$

48. An electrostatic recording apparatus, comprising:

a recording member having a surface on which an electrostatic latent image is formed;

a recording head, opposed to the recording surface of said recording member, for forming the electrostatic latent image thereon, said recording head comprising a plurality of first electodes extending in a first direction, a plurality of second electrodes extending in a second direction crossing with said first direction to form a matrix with said first electrodes, a third electrode disposed across said second electrodes from said first electrodes and having first apertures corresponding to said matrix of allowing ions to pass, a first dielectric member between said first electrodes and said second electrodes and a second dielectric member disposed between said second electrodes and said third electrode and having second apertures corresponding to said matrix for allowing the ions to pass;

alternating voltage applying means for applying an alternating voltage between said first electrodes and said second electrodes to effect discharging to produce ions;

first bias voltage applying means for applying a first bias voltage to said second electrode;

second bias voltage applying means for applying a second bias voltage different from said first bias voltage to said third electrode;

developing means for developing with a developer the electrostatic latent image formed on the recording surface by electric charge dots;

means for transferring a developed image developed by said developing means onto a recording material; and means for fixing an image transferred by said transferring means on the recording material;

wherein said first apertures of said third electrode have a diameter r, which satisfies:

$r \leqq 150$ microns, and wherein a latent image is formed on the recording surface with not less than 300 dots/inch density.

* * * * *

UNITED STATES PATENT AND TRADEMARK OFFICE
CERTIFICATE OF CORRECTION

PATENT NO. : 4,697,196

DATED : September 29, 1987

INVENTOR(S) : Yutaka Inaba, et al.

It is certified that error appears in the above-identified patent and that said Letters Patent is hereby corrected as shown below:

IN THE ABSTRACT

Line 3, change "Head, to" to --head, opposed to the recording surface of the recording member, for forming the electrostatic latent image thereon, the recording head comprising a plurality of first electrodes extending in a first direction, a plurality of second electrodes extending in a second direction crossing with the first direction to form a matrix with the first electrodes, a third electrode disposed across the second electrodes from the first electrodes and having first apertures for allowing ions to pass, a first dielectric member between the first electrodes and the second electrodes and a second dielectric member disposed between the second electrodes and the third electrode and having second apertures for allowing the ions to pass; alternating voltage source for applying an alternating voltage between the first electrodes and the second electrodes to--.

UNITED STATES PATENT AND TRADEMARK OFFICE

CERTIFICATE OF CORRECTION

PATENT NO. : 4,697,196

DATED : September 29, 1987

INVENTOR(S) : Yutaka Inaba, et al.

It is certified that error appears in the above-identified patent and that said Letters Patent is hereby corrected as shown below:

Line 11, delete "for".

Line 14, delete "For example, the number of occur-".

Line 15 to the end of Abstract, delete in its entirety.

COLUMN 1

Line 11, change "image" to --image,--.

Line 20, delete "of" (second occurrence).

COLUMN 2

Line 24, change "|VS-VD|/L," to --|Vs-Vd|/l,--.

Line 46, delete "12" (second occurrence).

COLUMN 3

Line 34, change "to" to --on--.

Line 36, change "small size" to --small-size--.

Line 44, change "(Here," to --(here,--.

Line 66, change "suming" to --sume--.

Line 68, change "occurs," to --occur--.

UNITED STATES PATENT AND TRADEMARK OFFICE

CERTIFICATE OF CORRECTION

PATENT NO. : 4,697,196
DATED : September 29, 1987
INVENTOR(S) : Yutaka Inaba, *et al.*

It is certified that error appears in the above-identified patent and that said Letters Patent is hereby corrected as shown below:

COLUMN 5

Line 14, "$Tf_1$" to --$Tf_2$--.

Line 50, change "limiation" to --limitation--.

Line 60 change "above mentioned" to --above-mentioned--.

COLUMN 6

Line 37, change "be" to --been--.

COLUMN 7

Line 13, change "satisfy r" to --satisfy the requirement that r--.

Line 37, change "P=600 Toor," to --P=600 Torr,--.

COLUMN 8

Line 9, change "versed" to --vealed--.

COLUMN 9

Line 5, change "a=2.07" to --q=2.07--.

Line 25, change "illustrated" to --illustrates--.

Line 29, change "are" to --is--.

UNITED STATES PATENT AND TRADEMARK OFFICE

CERTIFICATE OF CORRECTION

PATENT NO. : 4,697,196

DATED : September 29, 1987

INVENTOR(S) : Yutaka Inaba, et al.

It is certified that error appears in the above-identified patent and that said Letters Patent is hereby corrected as shown below:

Line 30, change "break down" to --breakdown--.

Line 34, delete "insulativeness,".

Line 37, change "were" to --was--.

Line 40, change "break down" to --breakdown--.

Line 42, change "break" to --break- --.

Line 53, change "break down" to --breakdown--.

Line 64, change "51" to --52--.

COLUMN 10

Line 11, change "member 22" to --member 52--.

Line 39, change "of allowing" to --for allowing--.

COLUMN 11

Line 13, before "m" insert --[--.

Line 20, before "m" insert --[--.

COLUMN 12

Line 24, change "of allowing" to --for following--.

UNITED STATES PATENT AND TRADEMARK OFFICE

CERTIFICATE OF CORRECTION

PATENT NO. : 4,697,196

DATED : September 29, 1987

INVENTOR(S) : Yutaka Inaba, et al.

It is certified that error appears in the above-identified patent and that said Letters Patent is hereby corrected as shown below:

COLUMN 14

Line 30, change "relationships," to --relationship, $2.65 \times 10^3 \leqq |Vs-Vd|/l$.--.

Line 60, change "of allowing" to --for allowing--.

COLUMN 15

Line 47, after "$10^3$" insert --$\leqq$--.

COLUMN 16

Line 35, before "1.6" insert --$\geqq$--.

Line 46, change "electodes" to --electrodes--.

Line 52, change "of allowing" to --for allowing--.

COLUMN 17

Line 12, before "1.6" insert --$\geqq$--.

Line 31, change "electodes" to --electrodes--.

COLUMN 18

Line 4, change "of" to --for--.

UNITED STATES PATENT AND TRADEMARK OFFICE

CERTIFICATE OF CORRECTION

PATENT NO. : 4,697,196

DATED : September 29, 1987

INVENTOR(S) : Yutaka Inaba, et al.

It is certified that error appears in the above-identified patent and that said Letters Patent is hereby corrected as shown below:

COLUMN 17

Line 12, before "1.6" insert -- $\geqq$ --.

Line 31, change "electodes" to --electrodes--.

COLUMN 18

Line 4, change "of" to --for--.

Signed and Sealed this

Twenty-seventh Day of June, 1989

Attest:

DONALD J. QUIGG

Attesting Officer

Commissioner of Patents and Trademarks